United States Patent
Jayakumar et al.

(10) Patent No.: US 10,445,154 B2
(45) Date of Patent: Oct. 15, 2019

(54) FIRMWARE-RELATED EVENT NOTIFICATION

(71) Applicant: Intel Corporation, Santa Clara, CA (US)

(72) Inventors: Sarathy Jayakumar, Portland, OR (US); Mohan J. Kumar, Aloha, OR (US); Vincent J. Zimmer, Federal Way, WA (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 219 days.

(21) Appl. No.: 15/435,444

(22) Filed: Feb. 17, 2017

(65) Prior Publication Data

US 2017/0161124 A1 Jun. 8, 2017

Related U.S. Application Data

(62) Division of application No. 14/751,733, filed on Jun. 26, 2015, now Pat. No. 9,612,887.

(51) Int. Cl.
*G06F 9/54* (2006.01)

(52) U.S. Cl.
CPC .............. *G06F 9/544* (2013.01); *G06F 9/542* (2013.01)

(58) Field of Classification Search
None
See application file for complete search history.

(56) References Cited

U.S. PATENT DOCUMENTS

| 6,131,131 | A * | 10/2000 | Bassman |
| 8,522,066 | B2 | 8/2013 | Zimmer et al. |
| 2005/0060526 | A1 | 3/2005 | Rothman et al. |
| 2005/0216721 | A1 | 9/2005 | Zimmer et al. |

(Continued)

FOREIGN PATENT DOCUMENTS

KR 10-2015-0026777 A 3/2015

OTHER PUBLICATIONS

International Preliminary Report on Patentability and Written Opinion issued in PCT Application No. PCT/US2016/034739, dated Jan. 4, 2018, 14 pages.

(Continued)

*Primary Examiner* — Syed A Roni
(74) *Attorney, Agent, or Firm* — Grossman, Tucker, Perreault & Pfleger, PLLC

(57) ABSTRACT

This disclosure is directed to firmware-related event notification. A device may comprise an operating system (OS) configured to operate on a platform. During initialization of the device a firmware module in the platform may load at least one globally unique identifier (GUID) into a firmware configuration table. When the platform notifies the OS, the firmware module may load at least one GUID into a platform notification table and may set a platform notification bit in a platform notification table status field. Upon detecting the notification, an OS management module may establish a source of the notification by querying the platform notification table. The platform notification bit may cause the OS management module to compare GUIDs in the platform notification table and the firmware configuration table. Services may be called based on any matching GUIDs. If no GUIDs match, the services may be called based on firmware variables in the device.

23 Claims, 8 Drawing Sheets

(56) References Cited

U.S. PATENT DOCUMENTS

| | | | |
|---|---|---|---|
| 2006/0075171 | A1 | 4/2006 | Wei |
| 2008/0148033 | A1* | 6/2008 | Sumner |
| 2009/0278679 | A1 | 11/2009 | Dailey et al. |
| 2011/0126043 | A1 | 5/2011 | Anderson et al. |
| 2013/0290778 | A1 | 10/2013 | Soderlund et al. |
| 2014/0250291 | A1 | 9/2014 | Adams et al. |
| 2014/0281577 | A1 | 9/2014 | Nicholes et al. |
| 2015/0067317 | A1 | 3/2015 | Bisht |
| 2016/0191481 | A1* | 6/2016 | Zimmer |
| 2016/0328564 | A1* | 11/2016 | Vidyadhara |

OTHER PUBLICATIONS

International Search Report and Written Opinion issued in PCT Application No. PCT/US2016/034739, dated Sep. 9, 2016, 16 pages.

Kallenberg, et al., "Extreme Privilege Escalation on Windows 8/UEFI Systems," The MITRE Corporation, 2014, 74 pages.

Vaughan-Nichols, Steven J: "Goodbye BIOS, hello UEFI", Nov. 10, 2011, pp. 1-4.

"Reliability, Availability and Serviceability (RAS) Integration and Validation Guide for the Intel Xeon Processor E7—v3 Family", Apr. 2015, pp. 1-23.

Anababa: "Simple is Better: Approach to retrieving the physical memory map on different systems (SFI, Legacy, JEFI)", Feb. 25, 2004, pp. 1-4.

Notice of Allowance issued in U.S. Appl. No. 14/751,733, dated Dec. 2, 2016, 12 pages.

Office Action issued in U.S. Appl. No. 14/751,733, dated Sep. 16, 2016, 19 pages.

Extended European Search Report received in European Patent Application No. 16814996, dated Jan. 24, 2019, 8 pages.

* cited by examiner

FIG. 4

Example ACPI EFIN Table 300'

| Field | Byte Length | Byte Offset | Description |
|---|---|---|---|
| Header | | | |
| Signature | 4 | 0 | "EFIN" Signature for EFIN Table |
| Length | 4 | 4 | Length (Bytes) of EFIN (e.g., implies # of Entry Fields at EOT). |
| Revision | 1 | 8 | EFIN Table Revision Number |
| Checksum | 1 | 9 | Entire EFIN Table Should Sum to Zero |
| OEMID | 6 | 10 | OEM ID |
| OEM Table ID | 8 | 16 | Table ID may be Manufacturer Model Identification |
| OEM Revision | 4 | 24 | Revision of EFIN Table for Supplied Table ID |
| Creator Revision | 4 | 32 | Vendor ID of Utility that Created the EFIN Table |
| EFIN-specific Entries | | | |
| EFIN Platform Communication Channel (PCC) Identifier | 12 | 36 | Identifier of EFIN PCC. May be used to Identify the PCC Subspace Structure in the PCCT. |

FIG. 5

Example PCC Shared Memory Space 308'

| Field | Byte Length | Byte Offset | Description |
|---|---|---|---|
| Signature | 4 | 0 | PCC Signature of "EFIN" |
| Command | 2 | 4 | PCC Command Field (e.g., ACPI Defined Format) |
| Status | 2 | 6 | PCC Status Field (e.g., ACPI Defined Format) |
| Communication Space | | | |
| Number of GUIDs | 2 | 8 | Number of GUIDs in "List of GUIDs" |
| List of GUIDS | Variable | 10 | List of GUIDs to be notified by the Platform |

Example Command Field 310'

| Field | Bit Length | Bit Offset | Description |
|---|---|---|---|
| Command | 8 | 0 | Not Operable - EFIN does not support commands |
| Reserved | 7 | 8 | Reserved |
| Generate SCI | 1 | 15 | Not Operable - EFIN does not support commands |

Example Status Field 312'

| Field | Bit Length | Bit Offset | Description |
|---|---|---|---|
| Command Complete | 1 | 0 | Not Operable - EFIN does not support commands |
| SCI Doorbell | 1 | 1 | Not Operable - EFIN does not support commands |
| Error | 1 | 2 | Not Operable - EFIN does not support commands |
| Platform Notification | 1 | 3 | If set, indicates that the platform is issuing an asynchronous notification to the OS |
| Reserved | 12 | 4 | Reserved |

FIG. 6

Example EFI Runtime Range Registers (RTRR) 600

Example Physical Base Control Register 602

| Bit | Scope | Default | Description |
|---|---|---|---|
| 63:XX | - | - | Reserved |
| XX:12 | Core | 0 | Physical Base (R/W): RTRR base address (e.g., "XX" may depend on addressability supported by the processor). |
| 11:3 | - | - | Reserved |
| 2:0 | Core | 0 | Type (R/W): Cacheability type for the RTRR memory range (e.g., may be set to "6" to represent write back (WB) memory). |

Example Runtime Range Physical Mask Register 604

| Bit | Scope | Default | Description |
|---|---|---|---|
| 63:XX | - | - | Reserved |
| XX:12 | Core | 0 | Physical Mask (R/W): RTRR memory range mask that determines the range of memory region being mapped. |
| 11 | Core | 0 | Valid (R/W): RTRR is valid when set. |
| 10:0 | - | - | Reserved |

FIRMWARE-RELATED EVENT NOTIFICATION

CROSS-REFERENCE TO RELATED APPLICATION

The present application is a divisional of U.S. patent application Ser. No. 14/751,733 filed Jun. 26, 2015, the entire disclosure of which is incorporated herein by reference.

TECHNICAL FIELD

The present disclosure relates to intra-device communication, and more particularly, to a system in a device for disseminating notifications originating in firmware to an operating system.

BACKGROUND

In a computing device, a "platform" may comprise equipment and/or software on which an operating system (OS) may execute. For example, when the device is initialized (e.g., booted, rebooted, etc.) firmware may load in the platform to provide software drivers, utilities, interfaces, etc. that the OS may employ to interact with the equipment in the platform. The firmware loaded during device initialization traditionally provided for baseline operation of the device. However, as the technology in computing devices evolves, so does the functionality provided by firmware. Modern firmware not only loads drivers, utilities, etc. that may be essential for device operation and OS/hardware interactivity, but may also provide enhanced functionality such as protective measures. For example, firmware may be configured to load known good programs that verify subsequently loaded programs, and to then encrypt these known-good programs in a secure area within the memory of the device, and thereby ensure that no malicious software (e.g., malware) can compromise the computing device when most vulnerable (e.g., during initialization when no OS-level security software has been loaded). Moreover, firmware may further be able to monitor for equipment changes in the computing device (e.g., peripheral additions and subtractions) and to determine of the equipment changes are safe (e.g., whether added devices are white-listed).

While the benefits of the above functionality are readily apparent, the manner in which to implement this type functionality is not. Firmware based on the Universal Extensible Firmware Interface (UEFI) may provide "runtime" features (e.g., programs that operate in the background while the computing device is operational) that may efficiently implement functionality such as described above, and thus, does not negatively affect the performance of the computing device. This may be compared to a byte code, such as based on the advanced configuration and power interface (ACPI) standard, which may be functional but introduces more processing overhead due to the need for a software interpreter to execute the code. In performing the operations the firmware may need to inform the OS of various events such as, for example, potential security breaches, hardware changes in the device, etc. However, firmware based on UEFI, while more efficient, does not comprise an effective vehicle for generating notifications to an OS in a device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 illustrates an example of an extensible firmware interface notification (EFIN) table in accordance with at least one embodiment of the present disclosure;

FIG. 5 illustrates an example of an extensible firmware interface platform communication channel (PCC) shared memory space in accordance with at least one embodiment of the present disclosure;

FIG. 6 illustrates an example extensible firmware interface physical base control register and an extensible firmware interface runtime range control register in accordance with at least one embodiment of the present disclosure;

Figure 1:
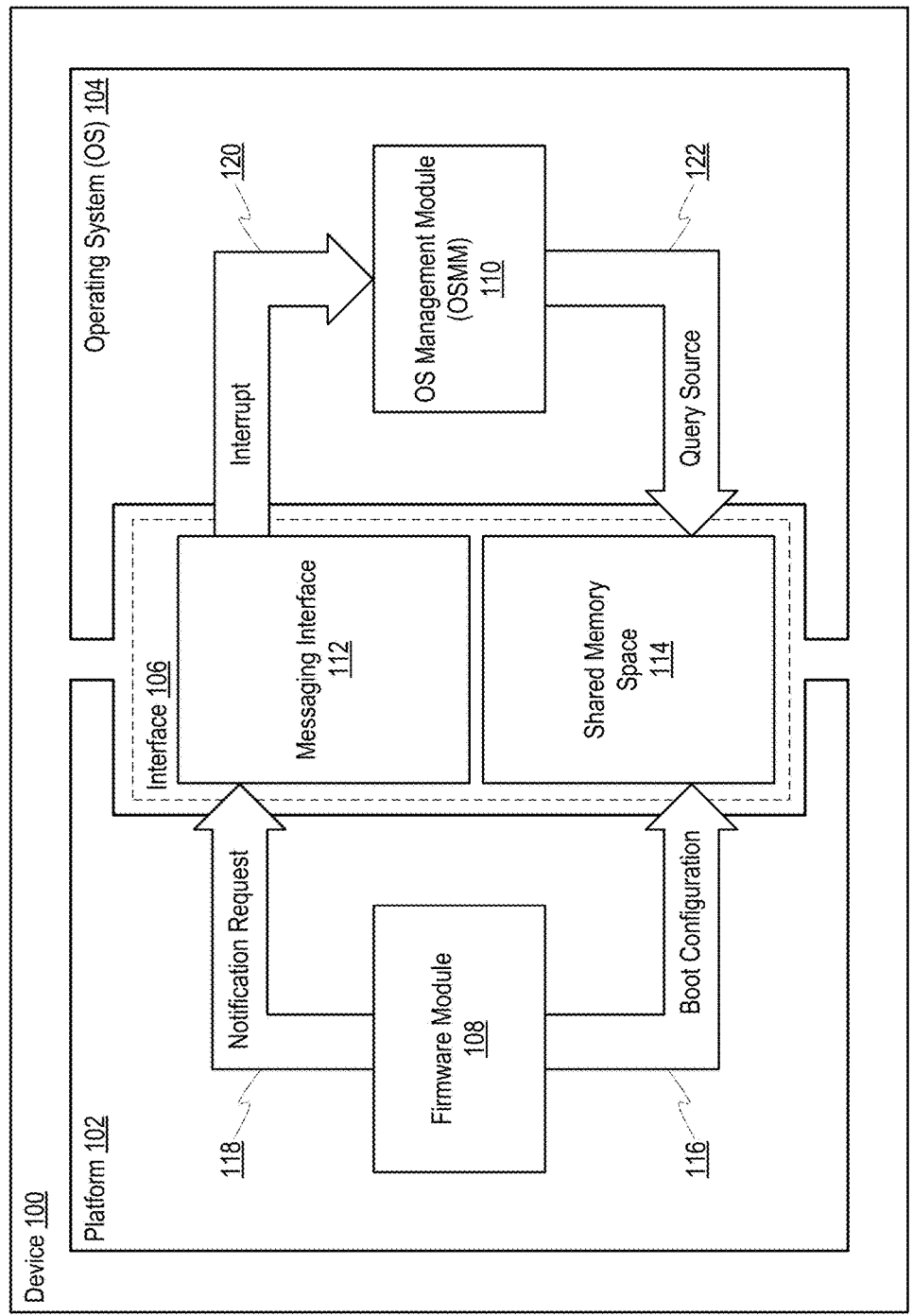
FIG. 1 illustrates an example device configured for firmware-related event notification in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to firmware-related event notification. In general, a device may comprise at least an operating system (OS) configured to operate on a platform. Initially, during device initialization (e.g., boot up) a firmware module in the platform may load at least one globally unique identifier (GUID) into a firmware configuration table in the device. During normal operation the OS may need to be notified of certain events occurring in the platform. On the occurrence of an event (e.g., based on a peripheral topology change), the firmware module may interact with a messaging interface to cause a notification to be generated to the OS. For example, the firmware module may load at least one GUID related to the event into a platform notification table existing within a shared memory space in the device, and may also set a platform notification bit in a status field in the platform notification table. A notification may then be generated, which may be detected by an OS management module (OSMM) in the OS. The OSMM may establish a source of the notification by, for example, querying the platform notification table. Upon determining that the platform notification bit has been set, the OSMM may compare the GUIDs set in the platform notification table and the firmware configuration table. If at least one GUID in the two tables are determined to match, a service may be called based on the matching GUID. Alternatively, services may be called based on firmware variables set in the device (e.g., returned in response to the OSMM issuing a GetVariable( ) command). Consistent with the present disclosure, at least the platform notification table may be protected from unauthorized changes using, for example, a physical range table and a physical mask table.

In at least one embodiment, an example device to generate firmware-related event notifications may comprise at least a memory module, a firmware module and a processing module. The memory module may include at least a shared memory space. The firmware module may be to load at least part of a messaging interface into the shared memory space and to cause the messaging interface to generate a notification to an OS in the device. The processing module may be to perform operations in the device based at least on instructions received from the OS, the operating system including an OSMM to at least react to the notification presented by the messaging interface.

During initialization of the device the firmware module may be to at least one of load at least one globally unique identifier and corresponding service identifier entry into a firmware configuration table or generate at least one firmware variable. The firmware configuration table may be based on, for example, the Unified Extensible Firmware Interface (UEFI) standard. The firmware module may be to load at least one GUID into a platform notification table in the shared memory space prior to a notification is being generated. The platform notification table may be based on, for example, the Advanced Configuration and Power Interface (ACPI) standard. The notification may be, for example, a system control interrupt (SCI). In at least one example implementation, the platform notification table may be protected by at least one of a physical base control register or a physical mask control register. The firmware module may be further to set at least one platform notification bit in a status field of the platform notification table.

In at least one embodiment, the OSMM may be to cause the processing module to discover the source of the notification by querying at least the platform notification table. In response to determining that the platform notification bit is set in the platform notification table, the OSMM may be to cause the processing module to determine if at least one GUID in the platform notification table is the same as any GUIDs loaded in the firmware configuration table. In response to determining that at least one GUID in the platform notification table is not the same as any GUIDs loaded in the firmware configuration table, the OSMM is to cause the processing module to request a firmware variable from the firmware configuration table. The OSMM may then be to cause the processing module to call at least one service in the operating system based on the service identifier corresponding to a GUID in the platform notification table that was determined to match a GUID in the firmware configuration table or a returned firmware variable.

In at least one embodiment, the notification may be generated based on a peripheral topology change detected in the device. Consistent with the present disclosure, an example method for generating firmware-related notifications may comprise configuring a firmware configuration table in a device, determining that a notification from a platform in the device needs to be generated for an operating system in the device, configuring a platform notification table in the device and generating the notification. Consistent with the present disclosure, an example method for receiving firmware-related notifications may comprise receiving a notification at an operating system in a device, discovering a source of the notification based at least on querying a platform notification table in the device and determining if a platform notification bit has been set in a status field of the platform notification table.

FIG. 1 illustrates an example device configured for firmware-related event notification in accordance with at least one embodiment of the present disclosure. Initially, the following may make reference to, or may use terminology commonly associated with, certain technologies for implementing firmware (e.g., UEFI), for implementing interfaces that may provide intra-device communication (e.g., ACPI), etc. These references are employed herein merely for the sake of explanation, and are not intended to limit embodiments consistent with the present disclosure to any particular manner of implementation. While these example technologies provide a basis for understanding the embodiments, actual implementations may employ other similar technologies existing now or developed in the future.

In general, device 100 may be any apparatus that comprises resources configurable to at least receive a data input, process the data and generate an output. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, a server, a group of computing devices organized in a high performance computing (HPC) architecture, a smart television or other type of "smart" device, small form factor computing solutions (e.g., for space-limited applications, TV set-top boxes, etc.) like the Next Unit of Computing (NUC) platform from the Intel Corporation, etc.

Device 100 may comprise at least platform 102 and OS 104. Platform 102 may include, for example, at least hardware resources and hardware-implemented software (e.g., firmware) on which OS 104 may execute. Consistent with the present disclosure, interface 106 may provide a way for at least firmware module 108 in platform 102 to interact with OS management module (OSMM) 110 in OS 104 to interact. Firmware module 108 may include, for example, hardware (e.g., non-volatile memory) configurable to implement certain code (e.g., a runtime application such as UEFI) upon initialization of device 100 (e.g., during initial boot up, during reboot, etc.). OSMM 110 may include at least one application, utility, service, etc. in OS 104 responsible for handling platform-related events. To facilitate interaction between firmware module 108 and OSMM 110, interface 106 may comprise at least messaging interface 112 and shared memory space 114. Messaging interface 112 may include a messaging system such as, but not limited to, ACPI that is able to generate notifications observable by OSMM 110. Shared memory space 114 may include at least one location in memory accessible to firmware module 108 and OSMM 110.

In an example of operation, during the initialization of device 100, firmware module 108 may load data entries (e.g., tuples) comprising GUIDs, which may comprise any arrangement of data that may be used to establish a unique identification globally within at least device 100, and corresponding pointers indicating services that may be loaded by OS 104 (e.g., by OSMM 110) as illustrated at 116. In at least one embodiment, the data entries may be loaded into a firmware configuration table. Upon an event occurring in platform 102 such as, for example, a change in the configuration of platform 102, a security issue, etc., firmware module 108 may request that messaging interface 112 generate a notification to OS 104 as shown at 118. Messaging interface 112 may then be configured to generate a notification to OS 104 as shown at 120. In at least one embodiment the notification may be an interrupt. The notification may then cause OSMM 110 to query at least shared memory space 114 as shown at 122 to find the source of the notification. Part of this process may involve determining whether GUIDs configured in tables corresponding to the notification match GUIDs originally configured in the firmware configuration table during device initialization. If any GUIDs are determined to match, then services corresponding to the matching GUIDs (e.g., based on the data loaded during boot configuration 116) may be called. Otherwise, alternative operations may occur such as, for example, using a command to obtain firmware variables that may have also been set during boot configuration 116, and calling any services that may correspond to the returned firmware variables. More specific examples of the above operations and structures will be described in FIGS. 3 to 8.

Various benefits may be realized in accordance with the operations and structures that are identified in FIG. 1. Consistent with the present disclosure, embodiments are provided that may allow for the execution of firmware-triggered services in OS 104. This may be achieved through a new class of range registers that may, in some embodiments, also include additional hardware-based protection. Trustworthiness in the above operations may be realized through, for example, digital signing of the UEFI images and/or a challenge/response with a security co-processor like the converged security and management engine (CSME) found in some microprocessor devices, such as those from the Intel Corporation.

This combination of execution and protection may allow for additional functionality to be incorporated into firmware module 108 (e.g., into UEFI runtime) while also addressing concerns about attacks on the same. In computer hierarchical protection theory wherein different levels of privilege and thought of as "rings," the highest privilege software/firmware may execute in "ring 0." The co-location of the runtime elements of firmware module 108 with the OS kernel drivers in ring 0 makes the firmware runtime especially attractive, vulnerable, etc. for attackers to target. Hardening the firmware runtime may provide the ability to safely leverage the firmware runtime (e.g., UEFI runtime) for additional runtime functionality. To that end, new platform capabilities may be exposed utilizing GUIDs and corresponding calls.

Historically new services required bus drivers, specialized processor registers to support instruction calls (e.g., CPUID leafs), and other types of specialization that may be prohibitive to flexible platform development. An example of this includes address-space mirroring, which is typically implemented in ACPI source language (ASL) but may be constrained by the semantics of ACPI machine language (AML) virtual machine. The historical technique of port-trapping into system management mode (SMM) may have a deleterious effect on large, scale systems (e.g., including hundreds of cores, wherein SMM latencies should be kept below than 120 µs).

Embodiments consistent with the present disclosure may solve problems stemming from there being no asynchronous notification mechanism for notifying OS 104 of an event occurring in platform 102, wherein in response OS 104 may invoke an application program interface (API) or service (e.g., an EFI variable service) for facilitating interaction with platform 102 (e.g., to get more information about the event, to process the event, to send commands to platform 102, etc.). An example where platform 102 may need to notify OS 104 is in address-based mirroring (e.g., in server platforms based on processor chipsets like the Xeon family from the Intel Corporation). Address mirroring may help bolster data integrity in server applications in that a processor may switch from one mirrored channel to another mirrored channel during a memory fault. Mirrored memory ranges may be exposed to OS 104 during initialization of device 100 so that OS 104 may load critical code (e.g., Kernel space) into the mirrored memory range to increase reliability. However, when the mirror "breaks" during fail-over (e.g., due to a memory fault), OS 104 may be notified of this event. Consistent with the present disclosure, the runtime portion of firmware module 108 (e.g., UEFI runtime) in platform 102 may be able to notify OS 104 of this event. In response to the notification, OS 104 may invoke a platform firmware API, a service based on a UEFI variable, etc. to discover the reason for the notification and handle it. In another example, OS 104 may request a start of an address-based memory inspection and correction operation (e.g., a patrol scrub) and platform 102 may be required to notify OS 104 at the end of the scrub.

The various embodiments disclosed herein may provide a way for the platform to get the attention of OS 104 without having to rely on ACPI Name Space-based notification. Instead, the richness of the UEFI framework may be leveraged instead of relying on the very limited abilities of interpreted ASL code. The limitations of ASL code may severely restrict deployment of more advanced features available in modern electronic equipment (e.g., microprocessors). The various embodiments disclosed herein may enable the usage of UEFI services instead of the ASL name space code for platform events.

Given that security concerns exist regarding malicious software (e.g., malware) that may be inserted with ring 0 privilege, detached or embedded signatures for entries in tables related to OS notification may be used (e.g., based on Authenticode-based signatures on the calls), so that a more secure dispatcher may ensure that the GUID-identified executables may chain up to some authority, such as platform keys in a UEFI secure boot. In the past, secure management mode (SMM) could protect critical codes at runtime. However, there is concern that invoking SMM on certain servers may create latency/scaling issues. Such concerns may be alleviated by, for example, moving authentication to a UEFI Runtime host embedded controller interface (HECI) call (e.g., via a dedicated HECI driver) to a trusted execution environment (TEE) such as the converged security manageability engine (CSME) supported in some processor chipsets from the Intel Corporation. CSME may then perform challenge/response with a security call back handler in firmware module 108. In addition, UEFI may expose peripheral connections on the platform (e.g. stream analyzer) to CSME, thereby allowing the TEE in the CSME to compare the newly added peripheral with provisioned "white-listed" devices to mitigate un-authorized data capture.

Figure 2:
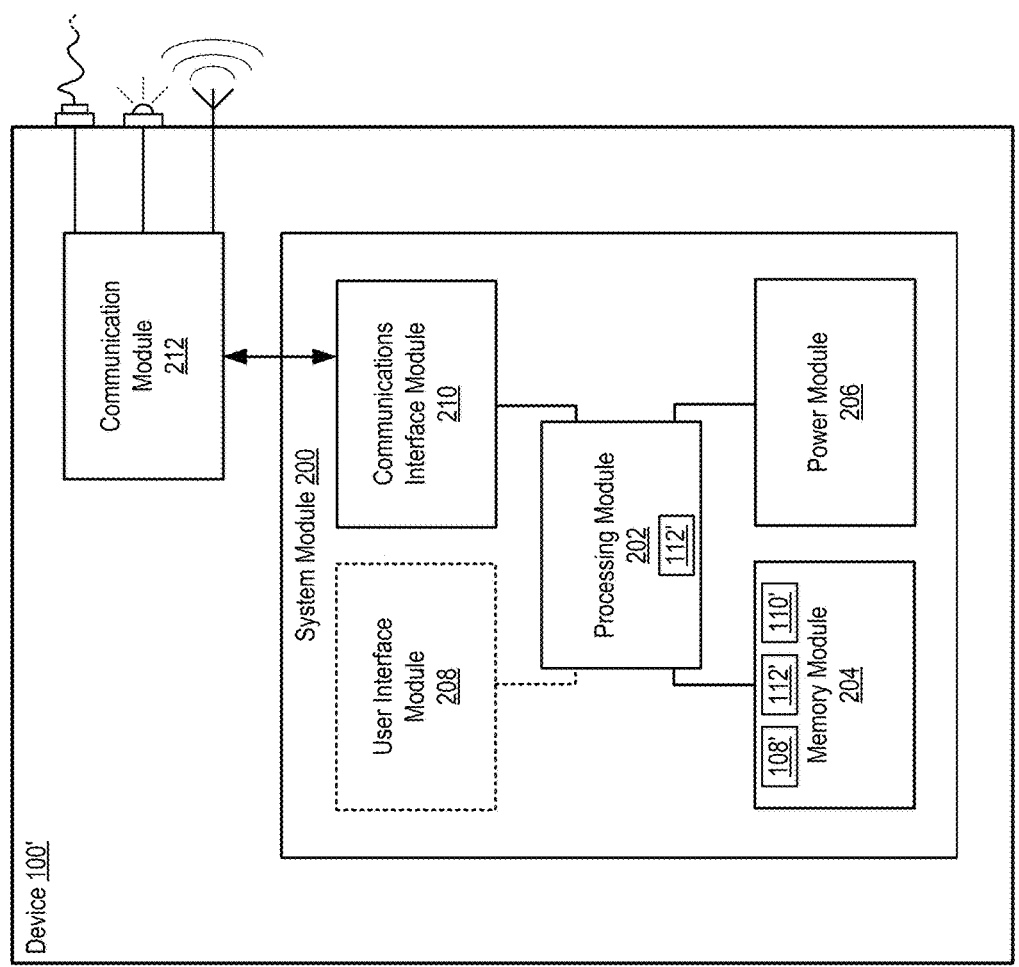
FIG. 2 illustrates an example configuration for a device usable in accordance with at least one embodiment of the present disclosure.

FIG. 2 illustrates an example configuration for a system usable in accordance with at least one embodiment of the present disclosure. The inclusion of an apostrophe after an item number (e.g., 100') in the present disclosure may indicate that an example embodiment of the particular item is being illustrated. For example, device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation.

Device 100' may comprise, for example, system module 200 to manage operation of the device. System module 200 may include, for example, processing module 202, memory module 204, power module 206, user interface module 208 and communication interface module 210. Device 100' may further include communication module 212. While communication module 212 is illustrated as separate from system module 200, the example configuration shown in FIG. 2 has been provided herein merely for the sake of explanation. Some or all of the functionality associated with communication module 212 may also be incorporated into system module 200.

In device 100', processing module 202 may comprise one or more processors situated in separate components, or alternatively one or more processing cores in a single component (e.g., in a system-on-chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Moreover, some or all of the functionality commonly associated with the support circuitry may also be included in the same physical package as the processor (e.g., such as in the Sandy Bridge family of processors available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory modules configured based on BIOS, UEFI, etc. to provide instructions when device 100' is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, external fuel cell, etc.), and related circuitry configured to supply device 100' with the power needed to operate. User interface module 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in user interface module 208 may be incorporated within device 100' and/or may be coupled to device 100' via a wired or wireless communication medium. User interface module 208 may be optional in certain circumstances such as, for example, a situation wherein device 100' is a server (e.g., rack server, blade server, etc.) that does not include user interface module 208, and instead relies on another device (e.g., a management terminal) for user interface functionality.

Communication interface module 210 may be configured to manage packet routing and other control functions for communication module 212, which may include resources configured to support wired and/or wireless communications. In some instances, device 100' may comprise more than one communication module 212 (e.g., including separate physical interface modules for wired protocols and/or wireless radios) managed by a centralized communication interface module 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated into the same module.

Consistent with the present disclosure, memory module 204 may comprise at least NV memory corresponding to firmware module 108' that during device initialization may cause at least firmware runtime code (e.g., UEFI runtime) to be loaded into RAM in memory module 204 and at least one firmware configuration table to be configured. OS 104 may later be loaded (e.g., along with OSMM 110') into the RAM. When platform 102 needs to alert OS 104 of an event, the runtime portion of firmware module 108' may interact with messaging interface 112' (e.g., ACPI) to cause processing module 202 to configure at least one table to be configured prior to a notification being generated to OS 104. In at least one embodiment, the table may be a platform notification table existing within shared memory space 112' in memory module 204.

Figure 3:
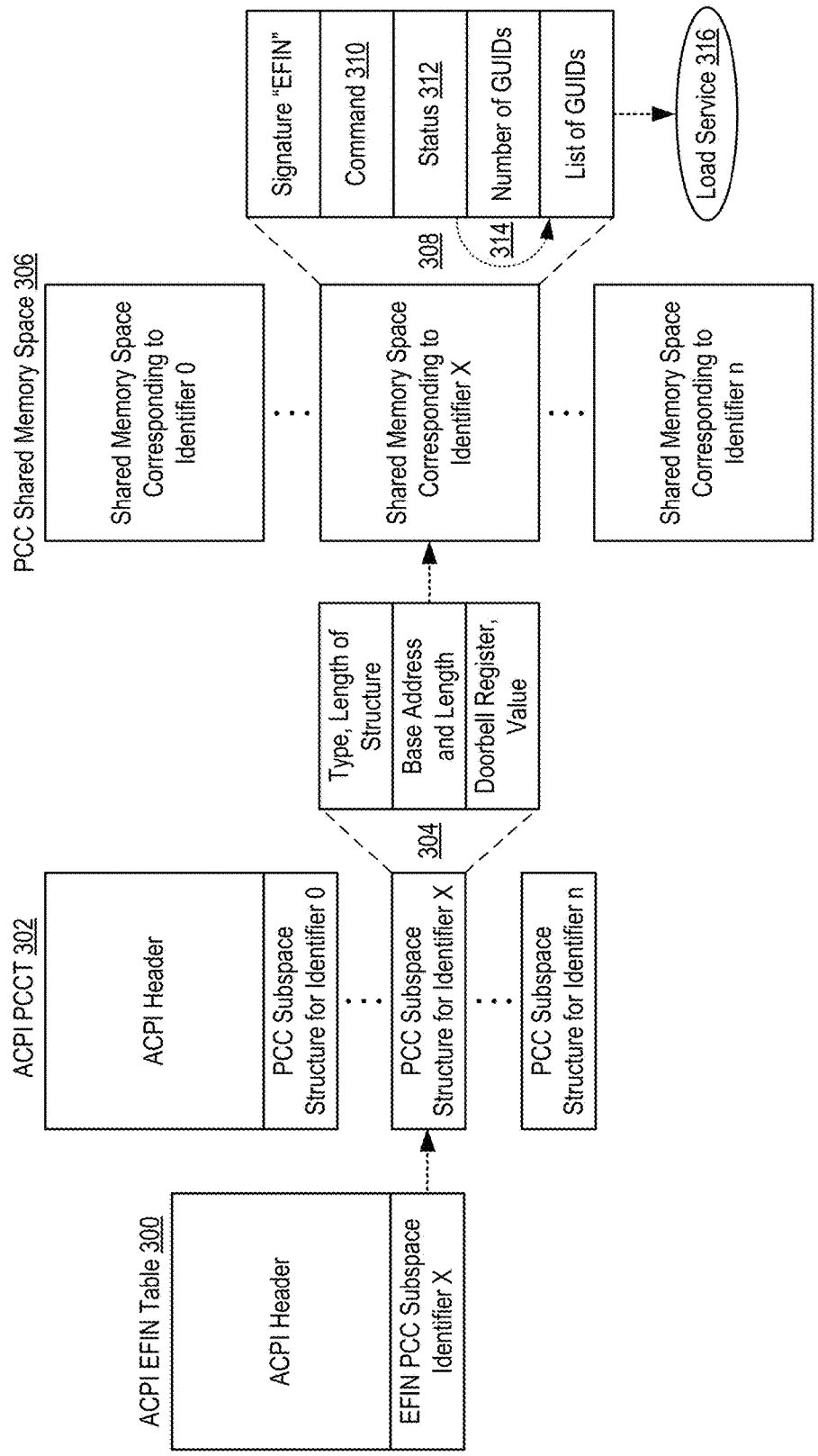
FIG. 3 illustrates an example of an interrupt source query in accordance with at least one embodiment of the present disclosure.

FIG. 3 illustrates an example of an interrupt source query in accordance with at least one embodiment of the present disclosure. Example interrupt query 124' illustrates various tables that may be traversed to determine a source corresponding to a system control interrupt (SCI). Initially, the structure EFI notification (EFIN) table 300 may be based on ACPI table implementation guidelines. EFIN table 300 may comprise at least an ACPI header and at least one EFIN PCC subspace identifier (e.g., "X" as illustrated in FIG. 3). A corresponding platform communication channel table (PCCT) is illustrated at 302. Typically when platform 102 notifies OS 104 utilizing SCI, OS 104 will read an ACPI status register in a processor core logic chipset (e.g. South Bridge) to identify the reason for the notification and then invoke a corresponding ASL name space method. For example, a non-native peripheral component interconnect express (PCIe) "Hotplug" event (e.g., the addition or removal of PCIe equipment while device 100 is running) may set a status bit and trigger a SCI to OS 104 causing OSMM 110 to respond by evaluating the ASL code determined to correspond to that status. The PCC mechanism was added to ACPI 5.0 so that OS 104 may also evaluate a table in addition to just an ASL method. ACPI PCCT 302 is an ACPI table including at least an ACPI header and an array of PCC subspace structures from 0 . . . n. Each PCC subspace may include an identifier that may correspond to the index position of the EFIN PCC subspace structure in PCCT 302 (e.g., in the example of FIG. 3, the PCC Subspace Structure for Identifier X may have an index of Y that may identify a corresponding PCC shared memory space 306). As shown at 304, PCC subspace structure for identifier X may comprise a type, length of the structure, the base address and length of the shared memory space and a doorbell register, value. The doorbell register may indicate the source of the SCI to OSMM 110 (e.g., the source "rings the doorbell" of OS 104 to interrupt executing code, and may be identified by the doorbell register).

PCC shared memory space 306 may include a number of feature specific tables which act as a mailbox for passing commands and parameters between platform 102 and OS 104. At least the example table structure illustrated at 308 may also be referenced as a "platform notification table." As shown at 308, the shared memory space corresponding to identifier X may comprise, for example, signature of "EFIN", a command field 310, a status field 312, a number of GUIDs and a list of GUIDs. In operation, status field 312 may comprise at least a platform notification bit that when set may trigger OS 104 (e.g., OSMM 110) to then inspect a list of GUIDs set in the shared memory space as shown at 314. The list of GUIDs in the shared memory space may be compared to GUIDs loaded in the firmware configuration table (e.g., an EFI system table) during device initialization. If any of the GUIDs loaded in the shared memory space are determined to match the firmware configuration table GUIDs, then at least one service identified in the firmware configuration table (e.g., by a pointer corresponding to the matching GUIDs) may be called as shown at 316. Otherwise, in at least one embodiment OSMM 110 may execute a GetVariable( ) operation using the GUIDs listed in the shared memory space, and may then call a service corresponding to any returned variables.

FIG. 4 illustrates an example EFIN table in accordance with at least one embodiment of the present disclosure. Example ACPI EFIN Table 300' may comprise at least an ACPI header and EFIN-specific entries. The ACPI header may comprise a signature (e.g., "EFIN"), a length in bytes of the EFIN, which may imply a number of EFIN-specific entry fields at the end of the table (EOT), an EFIN table revision number, a checksum for the EFIN table that should sum to zero for a "valid" table, an original equipment manufacturer (OEM) identification (ID) (e.g., for device 100 or equipment installed in device 100), an OEM Table ID (e.g., that may indicate a manufacturer model identification for device 100 or equipment installed in device 100) an OEM revision number corresponding to the EFIN table for the supplied OEM table ID, and a creator revision indicating a vendor ID of a utility (e.g., program, service, etc.) that created the EFIN table. EFIN-specific entries may include, for example, at least one EFIN PCC Identifier that may be used to identify a corresponding PCC subspace structure in the PCCT 302.

FIG. 5 illustrates an example EFI PCC shared memory space in accordance with at least one embodiment of the present disclosure. An example of PCC shared memory space 308' is illustrated in FIG. 5, followed by further table breakouts for command field 310' and status field 312'. PCC Shared memory space 308' may comprise, for example, a signature field (e.g., that may include a signature of "EFIN" indicating that it is the shared memory space for the EFIN), a PCC command field (e.g., in an ACPI defined format) and a status field (e.g., in an ACPI defined format). In at least one embodiment, a subsection of example shared memory space 308' may be defined as a "communication space" wherein at least the GUIDs to be notified by platform 102 to OS 104 may be listed with an indication of the total number of GUIDs in the list of GUIDs.

An example breakout table corresponding to the command field in shared memory space 308' is shown at 310'. Command field 310' may comprise, for example, a command bit string, a reserved bit string, and a generate SCI bit string. In at least one embodiment, one or more bits in the generate SCI bit string may be set to generate an SCI to OS 104. An example breakout table corresponding to the status field is shown at 312'. Status field 312' may comprise, for example, a command complete bit, an SCI doorbell bit, an error bit, a platform notification bit and a string of reserved bits. The SCI doorbell bit may be used to indicate the source of and SCI to OSMM 110 during a source query while the platform notification bit may indicate that OSMM 110 may need to examine the list of GUIDs to determine the services that need to be called to respond to notification (e.g., to address the event that occurred in platform 102).

FIG. 6 illustrates an example EFI physical base control register and an EFI runtime range control register in accordance with at least one embodiment of the present disclosure. Consistent with the present disclosure, modifying information in the platform notification table may trigger the generation of notifications to OS 104. In this regard, it may be possible to cause notifications to be triggered that may have an unintended effect of comprising security in device 100. For example, malware in device 100 could cause OSMM 104 to execute a service connected with a GUID that may allow the malware to obtain information from, or even get control over OS 104.

Security measures may be implemented in embodiments consistent with the present disclosure to protect this sort of unexpected behavior. For example, a runtime element of firmware module 108 (e.g., UEFI driver) may be signed utilizing, for example, an Authenticode dynamic linked library (DLL) from the Intel Corporation. The UEFI runtime may also be able to perform challenge/response interactions with a secured portion of system security (e.g., a virus protection program) that is running in a TEE implemented using, for example, secure guard extensions (SGX) from the Intel Corporation. This type of operation may allow a known good application running in the TEE to verify that the UEFI runtime is also known good (e.g., not compromised).

Alone or in combination with the above, a range register (e.g., in the manner of a memory type range register (MTRR) or system management range register) may be utilized to protect against unauthorized write access to EFI Runtime services. Examples of EFI runtime range registers (RTRR) 600 are illustrated at 602 and 604 in FIG. 6. These registers may be one-per-thread and set up by firmware module 108 prior to OS 104 taking control of device 100 (e.g., OS Handoff). In particular, registers 602 and 604 may be model-specific registers (MSRs) that the system boot firmware will program before OS hand-off to secure this area from being modified. In at least one embodiment, bit 12 of the IA32_MTRRCAP Register may indicate to firmware module 108 if RTRR is supported in device 100. Example physical base control register 602 and example runtime range physical mask register may be used to determine if a targeted physical addresses fall within the RTRR address range where the Runtime Services are present. EFI runtime range physical base control register 602 may define a base address and memory type for the EFI Runtime Service Range. In at least one embodiment, before attempting access to register 602, an RTRR support bit in an IA32_MTRRCAP register may need to be tested. If the RTRR support bit is not set to 1, a general protection (GP) exception may be raised on an attempt to access to register 602. Register 602 may comprise, for example, at least a physical base field and a type field. The physical base field may be read/write (R/W) and may set a base address wherein "XX" may depend on the addressability supported by the processor. The type field may also be R/W and may indicate a cacheability type for the RTRR memory (e.g., may be set to "6" to represent write back (WB) memory).

EFI runtime range physical mask control register may comprise, at least a mask used to determine the shared memory space address range. Similar to the above, the RTRR support bit in IA32_MTRRCAP register may need to be tested prior to accessing register 604. If it is determined that the RTRR support bit is not set to 1, a GP exception will be raised on access to this register. Register 604 may include, for example, at least a physical mask field and a valid field. The physical mask field may be R/W and may set a RTRR memory range mask that determines the range of a memory region being mapped. The valid field may also be R/W and may indicate that the RTRR is valid when set.

Figure 7:
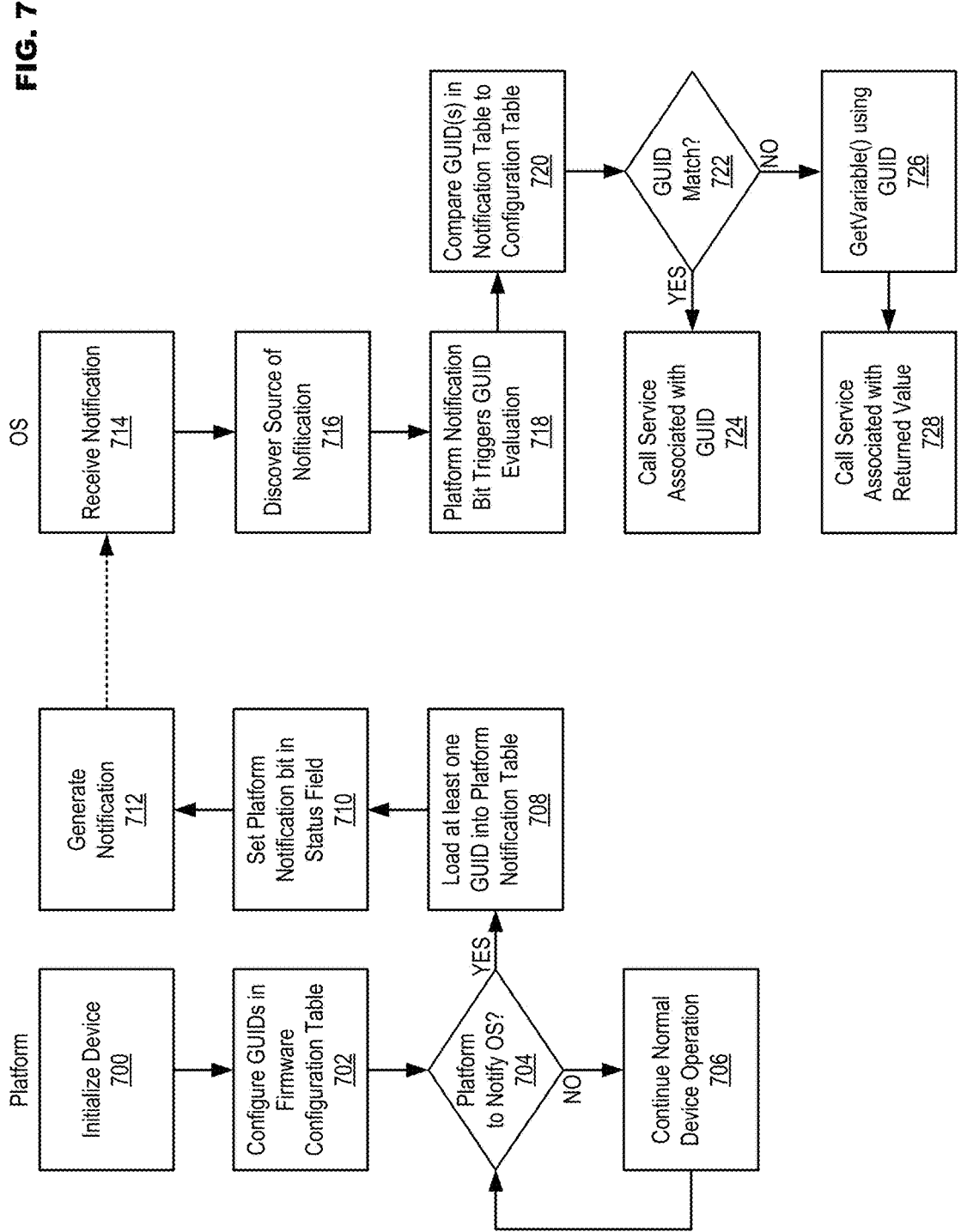
FIG. 7 illustrates example operations for generating and receiving firmware-related notifications in accordance with at least one embodiment of the present disclosure.

FIG. 7 illustrates example operations for generating and receiving firmware-related notifications in accordance with at least one embodiment of the present disclosure. Operations 700 to 712 may be performed by a platform in a device. In operation 700 the device may be initialized. During initialization GUIDs may be configured in at least a firmware configuration table (e.g., by a firmware module in the platform) in operation 702. In operations 704 and 706 normal operation may continue in the device until a determination in made in operation 704 that the platform needs to notify an OS in the device (e.g., based on an event occurring in the platform). The platform may then load at least one GUID into a platform notification table in operation 708 and may set a platform notification bit in a status field of the platform notification table in operation 710. A notification (e.g., SCI) may then be generated in operation 712.

Operations 714 to 728 may occur in the OS in the device. The notification generated by the platform in operation 712 may be receive by the OS in operation 714. In operation 716 the OS (e.g., an OSMM in the OS) may then discover the source of the notification. The source of the notification may be discovered by, for example, searching for a doorbell bit being set in an ACPI PCCT in the device. Given that the platform notification bit was set by the platform in operation 710, the set platform notification bit may then trigger the OS to evaluate GUIDs set in the platform notification table in operation 718. The OS may then compare any GUIDs set in the platform notification table to GUIDs that were set in the firmware configuration table during the initialization of the device. A determination may be made in operation 720 as to whether any of the GUIDs match. In in operation 722 it is determined that at least one of the GUIDs match, then in operation 724 at least one service corresponding to the at least one matching GUID in the firmware configuration table may be called by the OS. Alternatively, if in operation 722 it is determined that none of the GUIDs match, then in operation 726 a getvariable( ) command may be issued by the OS using the GUIDs set in the platform notification table, and in operation 728 any values returned by the getvariable( ) command may be used to call an associated service.

Figure 8:
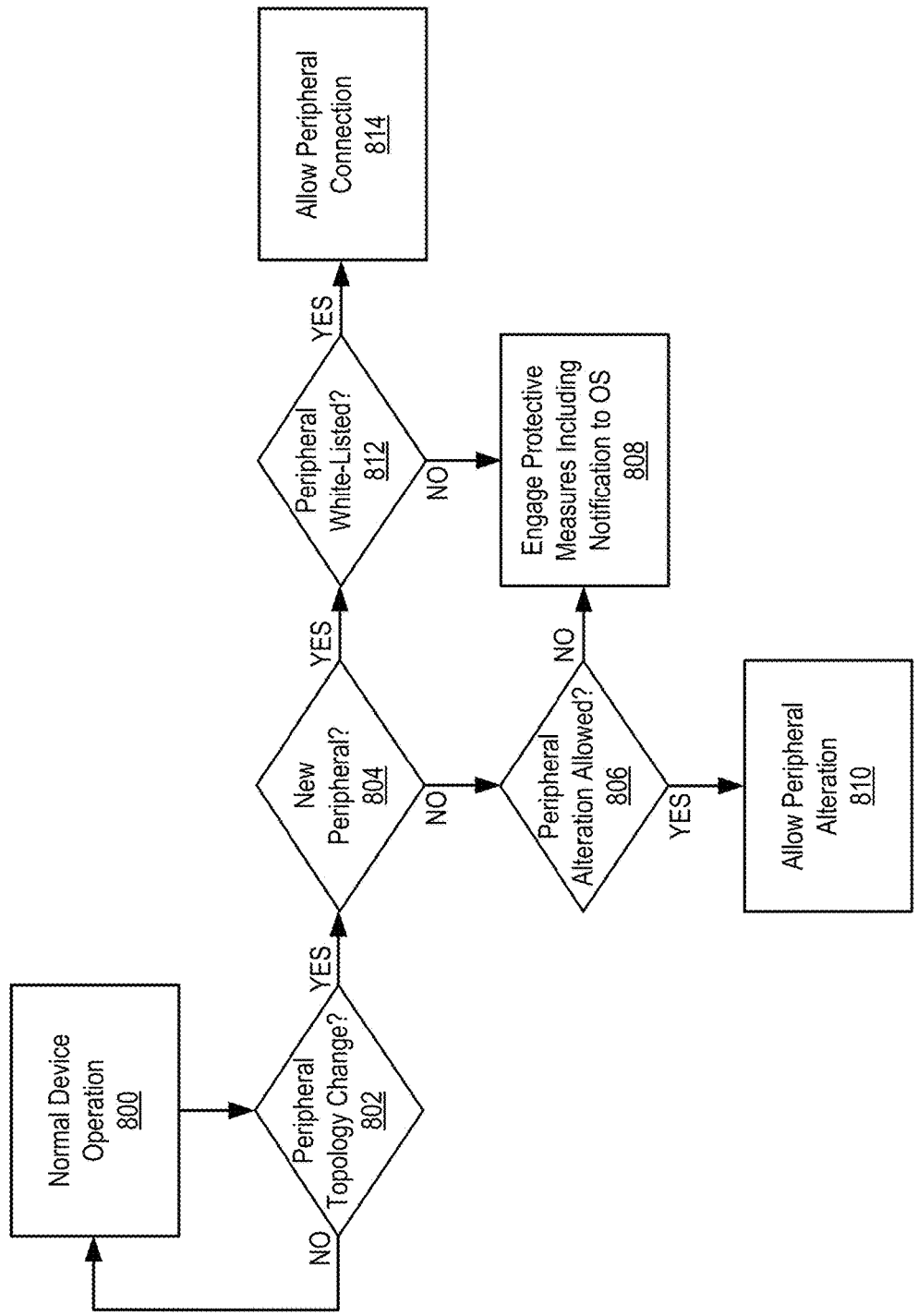
FIG. 8 illustrates example operations for generating an event notification regarding a peripheral topology change in a device in accordance with at least one embodiment of the present disclosure.

FIG. 8 illustrates example operations for generating an event notification regarding a peripheral topology change in a device in accordance with at least one embodiment of the present disclosure. A security-related example is presented in FIG. 8 wherein a device platform may be able to notify security resources executing in an OS of a peripheral topology change in the device. As referenced herein, a peripheral topology change may be a change (e.g., addition, removal, repositioning (e.g., to another port), reconfiguration, etc.) of hardware, equipment, etc. associated with the device that may be sensed by the platform, but potentially not by the OS.

Normal device operation may continue in operations 800 and 802 until in operation 802 a peripheral topology change is determined to have occurred in the device. A determination may then be made in operation 804 as to whether a new peripheral has been added to the device. If in operation 804 it is determined that a new peripheral has not been added to the device, then it may be presumed that an alteration has occurred wherein a peripheral has been disconnected from the device or changed in some other manner sensed by the platform. A determination may then be made in operation 806 as to whether alteration of the peripheral is allowed. If it is determined that the alteration is not allowed, then operation 808 protective measures may be taken including notifying the OS in accordance with the various embodiments disclosed herein. In in operation 806 it is determined that the detected peripheral alternation is allowed, then in operation 810 the peripheral alteration may be allowed to proceed.

Returning to operation 804, if it is determined that a new peripheral was added to the device then in operation 812 a determination may be made as to whether the added peripheral is white-listed (e.g., on a white list). A white list may be a list of known good or safe peripherals. A determination in operation 812 that the added peripheral is not white-listed may be followed by a return to operation 808 to engage security measures including notifying the OS. Otherwise, in operation 814 the connection of the new peripheral may be allowed.

While FIGS. 7 and 8 illustrate operations according to different embodiments, it is to be understood that not all of the operations depicted in FIGS. 7 and 8 are necessary for other embodiments. Indeed, it is fully contemplated herein that in other embodiments of the present disclosure, the operations depicted in FIGS. 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to firmware-related event notification. A device may comprise an operating system (OS) configured to operate on a platform. During initialization of the device a firmware module in the platform may load at least one globally unique identifier (GUID) into a firmware configuration table. When the platform notifies the OS, the firmware module may load at least one GUID into a platform notification table and may set a platform notification bit in a platform notification table status field. Upon detecting the notification, an OS management module may establish a source of the notification by querying the platform notification table. The platform notification bit may cause the OS management module to compare GUIDs in the platform notification table and the firmware configuration table. Services may be called based on any matching GUIDs. If no GUIDs match, the services may be called based on firmware variables in the device.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for firmware-related event notification.

According to example 1 there is provided a device to generate firmware-related event notifications. The device may comprise a memory module including at least a shared memory space, a firmware module to load at least part of a messaging interface into the shared memory space and to cause the messaging interface to generate a notification to an operating system in the device and a processing module to perform operations in the device based at least on instructions received from the operating system, the operating system including an operating system management module to at least react to the notification presented by the messaging interface.

Example 2 may include the elements of example 1, wherein during initialization of the device the firmware module is to at least one of load at least one globally unique identifier and corresponding service identifier entry into a firmware configuration table, or generate at least one firmware variable.

Example 3 may include the elements of example 2, wherein the firmware configuration table is based on the Unified Extensible Firmware Interface (UEFI) standard.

Example 4 may include the elements of any of examples 2 to 3, wherein the firmware module is to load at least one globally unique identifier into a platform notification table in the shared memory space prior to a notification being generated.

Example 5 may include the elements of example 4, wherein the platform notification table is based on the Advanced Configuration and Power Interface (ACPI) standard.

Example 6 may include the elements of any of examples 4 to 5, wherein the notification is a system control interrupt (SCI).

Example 7 may include the elements of any of examples 4 to 6, wherein the platform notification table is protected by at least one of a physical base control register or a physical mask control register.

Example 8 may include the elements of example 7, wherein the physical base control register is to protect against unauthorized writes to a runtime portion of the firmware module. Example 9 may include the elements of any of examples 7 to 8, wherein the physical mask control register is to determine an address range of the shared memory space.

Example 10 may include the elements of any of examples 4 to 9, wherein the firmware module is further to set at least one platform notification bit in a status field of the platform notification table.

Example 11 may include the elements of example 10, wherein the operating system management module is to cause the processing module to discover the source of the notification by querying at least the platform notification table.

Example 12 may include the elements of example 11, wherein the operating system management module is to discover the source of the notification by querying for a doorbell bit set in an Advanced Configuration and Power Interface (ACPI) platform communication channel (PCC) table.

Example 13 may include the elements of any of examples 10 to 12, wherein in response to determining that the platform notification bit is set in the platform notification table, the operating system management module is to cause the processing module to determine if at least one globally unique identifier in the platform notification table is the same as any globally unique identifiers loaded in the firmware configuration table.

Example 14 may include the elements of example 13, wherein in response to determining that at least one globally unique identifier in the platform notification table is not the same as any globally unique identifiers loaded in the firmware configuration table, the operating system management module is to cause the processing module to request a firmware variable from the firmware configuration table.

Example 15 may include the elements example 14, wherein the operating system management module is to cause the processing module to call at least one service in the operating system based on the service identifier corresponding to the globally unique identifier in the platform notification table that was determined to match a globally unique identifier in the firmware configuration table, or if no matching globally unique identifiers were determined, a returned firmware variable.

Example 16 may include the elements of any of examples 1 to 15, wherein the notification is generated based on a peripheral topology change detected in the device.

Example 17 may include the elements of example 16, wherein the notification is generated when peripheral alteration is not allowed or when a non-white-listed peripheral is added to the device.

Example 18 may include the elements of any of examples 1 to 17, wherein at least a runtime element of the firmware module is protected by signing using an Authenticode dynamic linked library.

Example 19 may include the elements of any of examples 1 to 18, wherein at least a runtime element of the firmware module is protected by challenge/response interactions performed by a portion of device security running within a trusted execution environment.

Example 20 may include the elements of example 19, wherein the trusted execution environment is established using Secure Guard Extensions.

According to example 21 there is provided a method for generating firmware-related notifications. The method may comprise configuring a firmware configuration table in a device, determining that a notification from a platform in the device needs to be generated for an operating system in the device, configuring a platform notification table in the device and generating the notification.

Example 22 may include the elements of example 21, wherein configuring the firmware configuration table comprises at least one of loading at least one globally unique identifier and corresponding service identifier entry into a firmware configuration table, or generating at least one firmware variable.

Example 23 may include the elements of any of examples 21 to 22, wherein configuring the platform notification table in the device comprises loading at least one globally unique identifier into the platform notification table and setting at least one platform notification bit in a status field.

Example 24 may include the elements of any of examples 21 to 23, and may further comprise determining that a notification is required based on detecting a peripheral topology change in the device.

Example 25 may include the elements of example 24, and may further comprise causing a notification to be generated when peripheral alteration is not allowed or when a non-white-listed peripheral is added to the device.

Example 26 may include the elements of any of examples 21 to 25, and may further comprise protecting at least the platform notification table with at least one of a physical base control register or a physical mask control register.

According to example 27 there is provided a method for receiving firmware-related notifications. The method may comprise receiving a notification at an operating system in a device, discovering a source of the notification based at least on querying a platform notification table in the device and determining if a platform notification bit has been set in a status field of the platform notification table.

Example 28 may include the elements of example 27, wherein discovering the source of the notification comprises querying for a doorbell bit set in an Advanced Configuration and Power Interface (ACPI) platform communication channel (PCC) table.

Example 29 may include the elements of any of examples 27 to 28, and may further comprise, in response to the platform bit being set, determining if at least one globally unique identifier in the platform notification table is the same as any globally unique identifiers loaded in a firmware configuration table in the device, in response to determining that at least one globally unique identifier in the platform notification table is not the same as any globally unique identifiers loaded in the firmware configuration table, requesting a firmware variable and calling at least one service in the operating system based on a service identifier corresponding to a globally unique identifier in the platform notification table that was determined to match a globally unique identifier in the firmware configuration table or a returned firmware variable.

According to example 30 there is provided a system including at least a device, the system being arranged to perform the method of any of the above examples 21 to 29.

According to example 31 there is provided a chipset arranged to perform the method of any of the above examples 21 to 29.

According to example 32 there is provided at least one machine readable medium comprising a plurality of instructions that, in response to be being executed on a computing device, cause the computing device to carry out the method according to any of the above examples 21 to 29.

According to example 33 there is provided a device configured for firmware-related event notification, the device being arranged to perform the method of any of the above examples 21 to 29.

According to example 34 there is provided a system for generating firmware-related notifications. The system may comprise means for configuring a firmware configuration table in a device, means for determining that a notification from a platform in the device needs to be generated for an operating system in the device, means for configuring a platform notification table in the device and means for generating the notification.

Example 35 may include the elements of example 34, wherein the means for configuring the firmware configuration table comprise means for at least one of loading at least one globally unique identifier entry into a firmware configuration table or generating at least one firmware variable.

Example 36 may include the elements of any of examples 34 to 35, wherein the means for configuring the platform notification table in the device comprise means for loading at least one globally unique identifier into the platform notification table and means for setting at least one platform notification bit in a status field of the platform notification table.

Example 37 may include the elements of any of examples 34 to 36, and may further comprise means for determining that a notification is required based on detecting a peripheral topology change in the device.

Example 38 may include the elements of example 37, and may further comprise means for causing a notification to be generated when peripheral alteration is not allowed or when a non-white-listed peripheral is added to the device.

Example 39 may include the elements of any of examples 34 to 38, and may further comprise means for protecting at least the platform notification table with at least one of a physical base control register or a physical mask control register.

According to example 40 there is provided a system for receiving firmware-related notifications. The system may comprise means for receiving a notification at an operating system in a device, means for discovering a source of the notification based at least on querying a platform notification table in the device and means for determining if a platform notification bit has been set in a status field of the platform notification table.

Example 41 may include the elements of example 40, wherein the means for discover the source of the notification comprises querying for a doorbell bit set in an Advanced Configuration and Power Interface (ACPI) platform communication channel (PCC) table.

Example 42 may include the elements of any of examples 40 to 41, and may further comprise means for, in response to the platform bit being set, determining if at least one globally unique identifier in the platform notification table is the same as any globally unique identifiers loaded in a firmware configuration table in the device, means for, in response to determining that at least one globally unique identifier in the platform notification table is not the same as any globally unique identifiers loaded in the firmware configuration table, requesting a firmware variable and means for calling at least one service in the operating system based on a service identifier corresponding to a globally unique identifier in the platform notification table that was determined to match a globally unique identifier in the firmware configuration table or a returned firmware variable.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device to generate firmware-related event notifications, comprising:
    a memory module including at least a shared memory space;
    a firmware module to load at least part of a messaging interface into the shared memory space and to cause the messaging interface to generate a notification to an operating system in the device;
    a trusted execution environment (TEE); and
    a processing module to perform operations in the device based at least on instructions received from the operating system, the operating system including an operating system management module to at least react to the notification presented by the messaging interface;
    wherein at least a runtime element of the firmware module is protected by challenge/response interactions performed by a runtime element of the firmware module executed within said TEE.

2. The device of claim 1, wherein during initialization of the device the firmware module is to at least one of load at least one globally unique identifier and corresponding service identifier entry into a firmware configuration table, or generate at least one firmware variable.

3. The device of claim 2, wherein the firmware configuration table is based on the Unified Extensible Firmware Interface (UEFI) standard.

4. The device of claim 2, wherein the firmware module is further to load at least one globally unique identifier into a platform notification table in the shared memory space prior to the notification being generated.

5. The device of claim 4, wherein the platform notification table is based on the Advanced Configuration and Power Interface (ACPI) standard.

6. The device of claim 4, wherein the platform notification table is protected by at least one of a physical base control register or a physical mask control register.

7. The device of claim 4, wherein the firmware module is further to set at least one platform notification bit in a status field of the platform notification table.

8. The device of claim 7, wherein in response to determining that the platform notification bit is set in the platform notification table, the operating system management module is to cause the processing module to determine if at least one globally unique identifier in the platform notification table is the same as any globally unique identifiers loaded in the firmware configuration table.

9. The device of claim 8, wherein in response to determining that at least one globally unique identifier in the platform notification table is not the same as any globally unique identifiers loaded in the firmware configuration table, the operating system management module is to cause the processing module to request a firmware variable from the firmware configuration table.

10. The device of claim 9, wherein the operating system management module is to cause the processing module to call at least one service in the operating system based on the service identifier corresponding to the globally unique identifier in the platform notification table that was determined to match a globally unique identifier in the firmware configuration table, or if no matching globally unique identifiers were determined, a returned firmware variable.

11. The device of claim 4, wherein the operating system management module is to cause the processing module to discover a source of the notification by querying at least the platform notification table.

12. The device of claim 1, wherein the notification is a system control interrupt (SCI).

13. The device of claim 1, wherein the notification is generated based on a peripheral topology change detected in the device.

14. A method for receiving firmware-related notifications, comprising:
receiving, at an operating system in a device, a notification generated by a messaging interface loaded via firmware circuitry into a shared memory space of the device, the firmware circuitry including at least runtime elements that are protected by challenge/response interactions executed within a trusted execution environment (TEE) of the device;
discovering, via the operating system in the device and responsive to the received notification, a source of the notification based at least on the operating system querying a platform notification table in the device; and
determining, via the operating system, if a platform notification bit has been set in a status field of the platform notification table.

15. The method of claim 14, further comprising:
in response to determining that the platform bit is set, determining if at least one globally unique identifier in the platform notification table is the same as any globally unique identifiers loaded in a firmware configuration table in the device.

16. The method of claim 15, further comprising:
in response to determining that at least one globally unique identifier in the platform notification table is not the same as any globally unique identifiers loaded in the firmware configuration table, requesting a firmware variable.

17. The method of claim 15, further comprising:
calling at least one service in the operating system based on a service identifier corresponding to a globally unique identifier in the platform notification table that was determined to match a globally unique identifier in the firmware configuration table or a returned firmware variable.

18. The method of claim 14, wherein discovering the source of the notification comprises querying a doorbell bit set in an Advanced Configuration and Power Interface (ACPI) platform communication channel (PCC) table.

19. At least one non-transitory machine-readable storage device having stored thereon, individually or in combination, instructions for generating firmware-related notifications that, when executed by one or more processors, cause the one or more processors to:
receive, at an operating system in a device, a notification generated by a messaging interface loaded via firmware circuitry into a shared memory space of the device, the firmware circuitry including at least runtime elements that are protected by challenge/response interactions executed within a trusted execution environment (TEE) of the device;
discover, via the operating system in the device and responsive to the received notification, a source of the notification based at least on querying a platform notification table in the device; and
determine, via the operating system, if a platform notification bit has been set in a status field of the platform notification table.

20. The at least one non-transitory machine-readable storage device of claim 19, wherein said instructions when executed further cause the one or more processors to:
determine, in response to determining that the platform bit is set, if at least one globally unique identifier in the platform notification table is the same as any globally unique identifiers loaded in a firmware configuration table in the device.

21. The at least one non-transitory machine-readable storage device of claim 20, wherein said instructions when executed further cause the one or more processors to:
request, in response to determining that at least one globally unique identifier in the platform notification table is not the same as any globally unique identifiers loaded in the firmware configuration table, a firmware variable.

22. The at least one non-transitory machine-readable storage device of claim 20, wherein said instructions when executed further cause the one or more processors to:
call, based on a service identifier corresponding to a globally unique identifier in the platform notification table that was determined to match a globally unique identifier in the firmware configuration table or a returned firmware variable, at least one service in the operating system.

23. The at least one non-transitory machine-readable storage device of claim 19, wherein discovering the source of the notification comprises querying a doorbell bit set in an Advanced Configuration and Power Interface (ACPI) platform communication channel (PCC) table.

* * * * *